Nov. 23, 1954   W. B. McLEAN   2,695,365
REGULATING TURBINE GENERATOR
Filed Nov. 13, 1953

INVENTOR.
WILLIAM B. MC LEAN
BY
ATTORNEYS

United States Patent Office 2,695,365
Patented Nov. 23, 1954

2,695,365

REGULATING TURBINE GENERATOR

William B. McLean, China Lake, Calif., assignor to the United States of America as represented by the Secretary of the Navy Application November 13, 1953, Serial No. 392,063

3 Claims. (Cl. 290—2)

(Granted under Title 35, U. S. Code (1952), sec. 266)

The invention described herein may be manufactured and used by or for the Government of the United States of America for governmental purposes without the payment of any royalties thereon or therefor.

This invention relates to an A. C. power supply adapted for use in guided missiles, and in particular to an alternative form of frequency and voltage regulating means of the general type described and claimed in my co-pending patent application No. 392,064 filed November 13, 1953, and entitled A. C. Power Supply.

In this invention regulation of the frequency and amplitude of the output voltage of a magneto alternator is achieved by controlling the power supplied to said alternator.

It is an object of this invention to provide an A. C. power supply for guided missiles having incorporated therein means for regulating the frequency and amplitude of the output voltage.

Other objects and many of the attendant advantages of this invention will be readily appreciated as the same become better understood by reference to the following detailed description when considered in connection with the accompanying drawings wherein.

Figure 1:
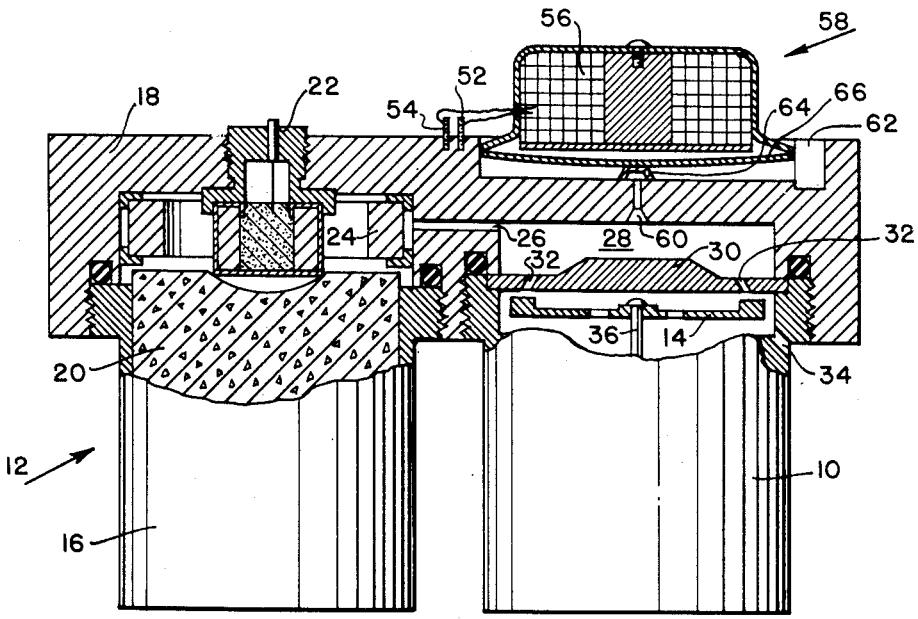
Fig. 1 is a side elevation, portions being broken away to the longitudinal central axis of the A. C. power supply.

In Fig. 1, A. C. generator, or magneto alternator, 10 is of a conventional design which uses permanent magnets to provide the field so that the magnitude and frequency of the output voltage of generator 10 increases linearly as the angular velocity of the rotor of generator 10 increases. Power to drive A. C. generator 10 is obtained from gas generator 12 and turbine 14. Gas generator 12 comprises a hollow cylinder 16 which is closed at one end. The other end of cylinder 16 is threaded to permit the cylinder to be secured to base 18. A slow burning double base propellant grain 20 is located within the combustion chamber formed by cylinder 16 and base 18. An igniter 22 is mounted in base 18, and when energized by conventional means, which are not illustrated, starts propellant grain 20 burning. As propellant grain 20 burns gases evolve at substantially a constant rate and pass through ceramic filter 24 and orifice 26 into manifold 28. Filter 24 removes any solid particles that may be present in the gas. One of the boundaries of manifold 28 is formed by wall member 30 which is held in position between base 18 and A. C. generator 10. A plurality of orifices 32 are formed in member 30 and direct the gas within manifold 28 against the buckets, which are not illustrated, formed in turbine 14 to cause said turbine to rotate. The gases after expanding to drive turbine 14 escape to the atmosphere through orifices 34 which are formed through the outer wall of A. C. generator 10. Turbine 14 drives the rotor of A. C. generator 10 by means of shaft 36.

Figure 2:
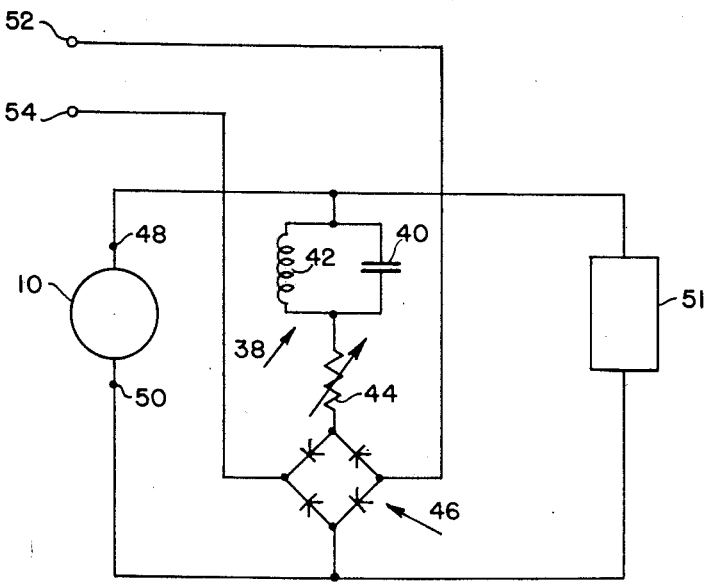
Fig. 2 is a schematic wiring diagram of the frequency and voltage regulating means of the power supply.

Referring now to Fig. 2, the regulating means of the power supply consists of a parallel resonant circuit 38, formed by condenser 40 and inductance 42; a variable resistor 44; and a full wave rectifying network 46 connected in series. The regulating means is connected between the output terminals 48, 50 of generator 10 in parallel with the substantially constant load impedance 51. The direct current output of rectifier 46 is connected through terminals 52, 54 to flow through the solenoid 56 of pressure relief valve 58 seen in Fig. 1. Passage 60 is formed in base 18 and communicates the interior of manifold 28 with the atmosphere through opening 62 when the valve cover 64 does not close, or seal, passage 60. Valve cover 64 is secured to resilient metal disc 66 which is made of a ferromagnetic material and which is biased so that cover 64 seals passage 60. When the magnetic field due to the direct current flowing in the solenoid 56 acting on disc 66 and the pressure acting on cover 64 are sufficiently large to overcome the spring bias of said disc, valve cover 64 is lifted to permit gas to escape from within manifold 28 through passage 60 and opening 62 to the atmosphere.

In operation, shortly before the missile in which the power supply is adapted to be mounted is launched, igniter 22 is energized and starts propellant grain 20 to burning. Gas evolved from burning grain 20, flows through filter 24 and orifice 26 into manifold 28. At this time passage 60 is closed by valve cover 64. The evolved gas passes through orifices 32 and strikes the buckets of turbine wheel 14 to cause it to rotate at high speed. By means of shaft 36 the rotor of magneto alternator 10 is rotated so that an output voltage is produced by the alternator between terminals 48 and 50.

The resonant frequency of circuit 38 is less than the desired frequency of the output voltage of alternator 10; i. e., in a preferred example, the desired frequency of the output voltage is 6000 cycles per second, and the resonant frequency of circuit 38 is 5000 cycles per second. The value of resistor 44 is selected so that when the frequency of the output voltage exceeds the desired frequency of 6000 cycles, the current flowing through solenoid 56 of relief valve 58 aided by the pressure in manifold 28 is sufficient to lift valve cover 64 and permit gas within manifold 28 to escape to atmosphere. The escape of gas through passage 60 and opening 62 reduces the pressure of the gas within manifold 28 so that the power being applied to generator 10 by turbine 14 is reduced and the speed at which turbine 14 turns is also reduced which in turn reduces the frequency of the output voltage and maintains it at the desired magnitude. Since the frequency and the amplitude of the output voltage of generator 10 are related, regulation of the frequency of the output voltage also regulates the amplitude of the output voltage.

Obviously many modifications and variations of the present invention are possible in the light of the above teachings. It is, therefore, to be understood that within the scope of the appended claims the invention may be practiced otherwise than as specifically described.

What is claimed is:

1. Frequency regulating means for a gas turbine powered magneto alternator adapted to produce an output voltage comprising a solenoid operated pressure relief valve for controlling the pressure of the gas applied to said gas turbine; a parallel resonant circuit having a resonant frequency less than the desired frequency of the output voltage; a resistor; circuit rectifier means; said resonant circuit, resistor, and rectifier means connected in series and adapted to have the output voltage of said alternator applied thereacross, circuit means between said rectifier means and the solenoid of said relief valve for causing D. C. current from said rectifier means to flow through the solenoid of said valve, the value of said resistor being such that the current flow through the solenoid operates said relief valve to decrease the pressure of the fluid applied to said turbine when the frequency of the output voltage exceeds the desired frequency.

2. An A. C. power supply comprising a gas generator having a combustion chamber, a slow burning double base propellant within said chamber, means for igniting said propellant, a magneto alternator adapted to produce an output voltage, a gas turbine, means communicating said combustion chamber and said turbine, said communication means being provided with an electrically operated pressure relief valve, and frequency regulating means comprising a parallel resonant circuit having a resonant frequency which is less than a desired frequency of the output voltage of said alternator, a resistor, and a full wave rectifying network connected in series, said frequency regulating means connected to have applied thereacross the output voltage of said alternator, and circuit means connecting said electrically operated valve with the full wave rectifier and adapted to cause direct current to flow through said electrically operated relief valve, the value of said resistor being such that said relief valve operates to decrease the pressure of the gas applied to said turbine when the frequency of said output voltage of said alternator exceeds said desired frequency.

3. An A. C. power supply comprising a gas generator having a combustion chamber, a solid slow burning double base propellant within said chamber, means for igniting said propellant, a magneto alternator adapted to produce an output voltage, a turbine, a manifold, means communicating said manifold with said combustion chamber, an electrical solenoid operated pressure relief valve for said manifold, orifices in said manifold communicating with said turbine, said turbine being operatively connected to said alternator, a parallel resonant circuit having a resonant frequency which is less than a desired frequency of the output voltage of said alternator, a resistor, and a full wave rectifier connected to have applied thereacross the output voltage of said alternator, said resonant circuit, resistor, and full wave rectifier being connected in series, and an electrical circuit connecting the solenoid of the pressure relief valve with the full wave rectifier, the latter adapted to cause direct current to flow through said solenoid, the value of said resistor being such that said relief valve operates to reduce the pressure of the gas within the manifold when the frequency of the output voltage of said alternator exceeds said desired frequency.

References Cited in the file of this patent

UNITED STATES PATENTS

| Number | Name | Date |
|---|---|---|
| 1,751,539 | Wunsch | Mar. 25, 1930 |
| 2,154,572 | Lansing | Apr. 18, 1939 |
| 2,207,936 | Nardone | July 16, 1940 |
| 2,401,163 | Keller | May 28, 1946 |
| 2,431,501 | Phillips | Nov. 25, 1947 |
| 2,578,443 | Nardone | Dec. 11, 1951 |
| 2,642,543 | Teague, Jr., et al. | June 16, 1953 |